Oct. 30, 1951     V. J. SALEMME     2,573,065
MAGNETIC FLUID CLUTCH AND BRAKE
Filed Nov. 17, 1948
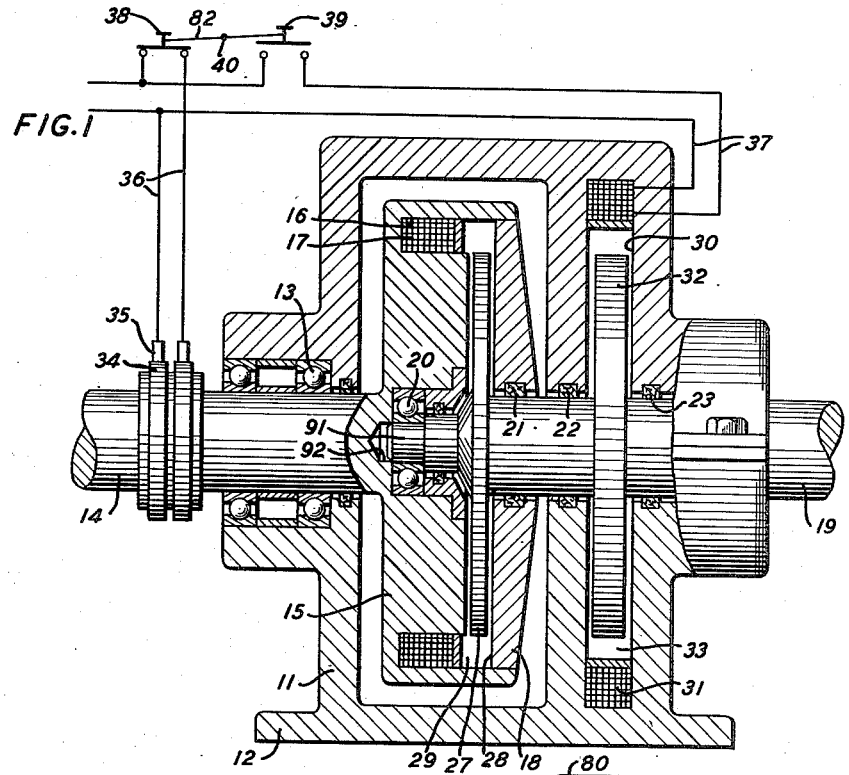
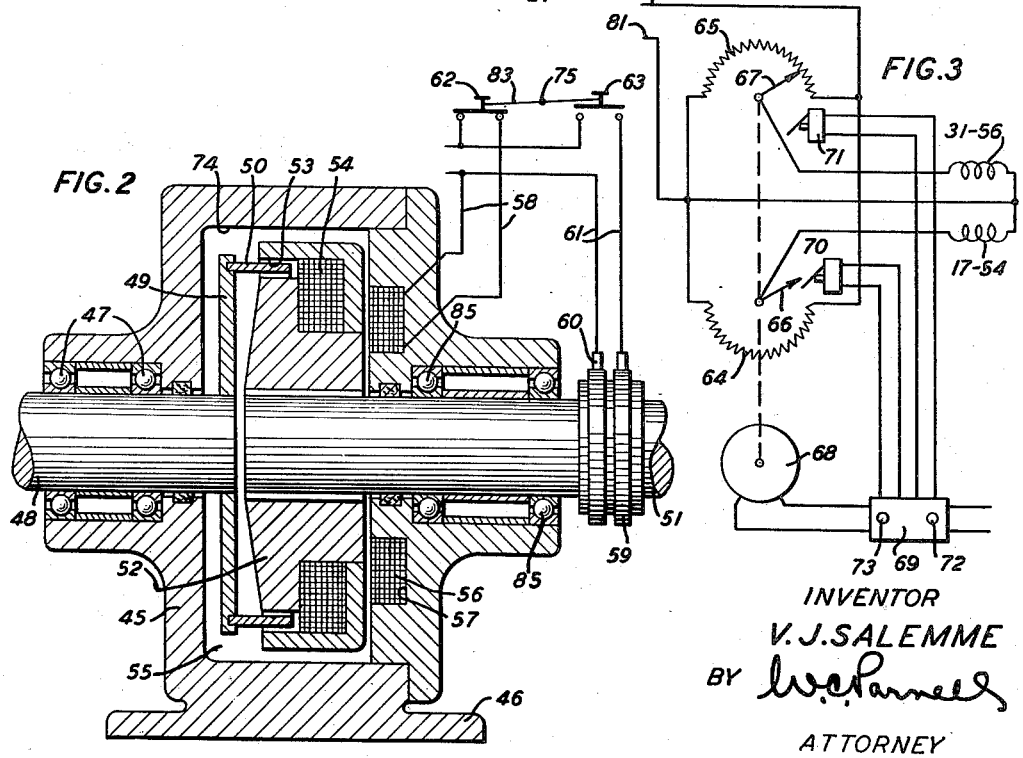
INVENTOR
V. J. SALEMME
BY *[signature]*
ATTORNEY Patented Oct. 30, 1951

2,573,065

UNITED STATES PATENT OFFICE 2,573,065

MAGNETIC FLUID CLUTCH AND BRAKE

Vincent J. Salemme, Staten Island, N. Y., assignor to Western Electric Company, Incorporated, New York, N. Y., a corporation of New York Application November 17, 1948, Serial No. 60,496

5 Claims. (Cl. 192—12)

This invention relates to clutch and brake mechanisms for power transmission systems, and the object of the invention is a compact combination unit of this type which will operate satisfactorily over long periods with very little maintenance expense.

In machines for twisting strands of wire together, which is one application of the proposed invention, the twisting apparatus is usually started by connecting it to the driving motor through a clutch. Stopping is done by disconnecting the twisting apparatus from the clutch and connecting it to a suitable brake. Nearly all twisting machines use some form of friction engagement in their clutch and brake, thereby giving rise to a constant problem of maintenance, the problem being acute where large numbers of twisting machines are involved.

Where conventional multiple disc type clutches are used on these twisting machines separately from the brake, an additional problem arises in that there is usually a small of amount of sliding frictional contact between the rotating and stationary discs even with the clutch disengaged and this contact is often sufficient to overcome the inertia of the twister and cause it to turn. This rotation of the twister with the clutch disengaged is dangerous in addition to disrupting the manufacturing process.

The use in wire twisters of a magnetic fluid coupling of the type recently developed by Jacob Rabinow of the National Bureau of Standards would solve the maintenance problem presented by the multiple disc type couplings as the magnetic fluid coupling operates by means of a magnetic field and does not depend upon friction for its transmission of power. In Mr. Rabinow's coupling, as explained in the National Bureau of Standards Technical News Bulletin of May 1948, two plates of magnetic material are surrounded by a liquid such as oil in which are suspended finely divided magnetic particles. When this fluid suspension is acted upon by a magnetic field, the magnetic particles line up in the magnetic field and solidify. This solidification causes the magnetic material to operatively connect the two plates so that if one plate is rotating, the other plate is driven by it.

In using the coupling developed by Rabinow as a clutch only, there is always a problem of the driven half of the coupling being rotated by the viscous drag of the magnetic fluid suspension. Expedients to minimize the effect of the viscous drag, such as by lowering the ratio of magnetic particles to oil, usually result in reducing the torque output of the coupling.

Applicant's invention overcomes the effect of the viscous drag on the driven half of the coupling without reducing the torque output by using two magnetic fluid type couplings in conjunction with each other to form a combination clutch and brake. The control circuits for the clutch coil and the brake coil are tied in together so that the same switching action deenergizes the clutch and instantaneously energizes the brake. Since the driven shaft is braked at all times when it is not in clutching engagement, the viscous drag of the fluid suspension does not present a problem.

By placing the clutch and brake couplings within the same housing, an appreciable saving in space and material cost is effected, and the operating setup is simplified. In one species of the invention, one member is used for both the clutching and the braking action, which results in an even greater saving in space.

Another feature of applicant's invention is that the period for attaining the maximum clutching and braking effect can be controlled automatically, thus taking this function out of the hands of the operator of the machine. It has been found by past experience that where the operator has the duty of manually moving a lever to engage a clutch or brake gradually, the lever is usually jammed to the position of engagement, the result being a jar and a shock to the mechanical system. By utilizing a synchronous motor timer, applicant causes the acceleration and deceleration of the clutching action and the braking action to be accomplished in a predetermined time, not subject to variation by the operator.

While the main features of the invention have been designed with particular reference to use in twisting machines, their advantages are not peculiar to that type machine, but are of general application.

In one embodiment, the invention comprises a housing frame containing a closed chamber. In spaced relation within the chamber are a magnetic driving clutch member and a magnetic driven clutch member, mounted on a driving shaft and a driven shaft respectively. The remaining space in the chamber is filled with a magnetic fluid suspension, consisting of an oil in which is suspended a quantity of finely divided magnetic particles.

A clutch coil is positioned within the rotating clutch member and a brake coil is positioned in a recess in a side wall of the chamber, these coils being energized by leads connected to an outside source of power supply. When the clutch coil is energized, a magnetic field is set up through the two clutch members and the magnetic fluid suspension, causing the magnetic particles to align themselves in the magnetic field and solidify. In this state, the magnetic material serves to operatively connect the two clutch members so that a rotation of one member will cause the other member to be rotated in the same direction. When the brake coil is energized, the magnetic field set up between the housing frame, the driven clutch member and the magnetic fluid suspension causes the driven clutch member to be brought to a halt through the operative connection between the housing frame and the driven clutch member caused by the aligned magnetic particles.

The two pushbuttons which close the clutch coil circuit and the brake coil circuit are so interlocked that the closing of either of the two circuits will substantially simultaneously open the other.

Other objects and advantages will be apparent from the following detailed description when considered in conjunction with the accompanying drawing in which:

Fig. 1 is a side cutaway view of the combination magnetic fluid type clutch and brake showing two driven members, one for use with the clutch action and the other for use with the brake action.

Fig. 2 is a side cutaway view of the combination showing one driven member which is used in both the braking and clutching action.

Fig. 3 is a diagram of the control system used to effect a gradual increase and decrease in the clutch and brake torques in a predetermined time.

With reference to Fig. 1 of the drawings, which shows one species of the invention, a frame housing 11 is supported by an integral base 12. One end of the frame housing 11 is journaled to receive bearings 13, and the said bearings in turn support a driving shaft 14, connected to any suitable source of motive power. Integral with the driving shaft 14 is a driving clutch member 15 which contains an annular groove 16 in which is positioned a clutch coil 17. Securely fastened to the clutch member 15, so as to turn with it, is a plate 18.

A driven shaft 19 is supported by bearings 20 positioned in the clutch housing 15, by bearings 21, positioned in the plate 18, and by bearings 22 and 23, positioned in the frame housing 11. The part of the shaft 19 supported by the bearings 20 is a reduced portion 91 which tapers outwardly where it joins the main part of the shaft. A central aperture 92 of the clutch housing 15 is correspondingly shaped to receive this reduced and tapered portion.

Integral with the shaft 19 is a driven clutch disc 27 which is positioned in an annular compartment 28, lying between the plate 18 and the body of the driving clutch member 15. This compartment 28 is filled with a mineral oil, such as any light machine oil. A finely divided magnetic material, such as carbonyl iron (E), is suspended in the oil, forming a magnetic fluid suspension 29.

Mounted on the driven shaft 19 and positioned within an annular compartment 30 of the frame housing 11, is a braking disc 32. Also positioned in the outer periphery of the annular compartment 30 is a brake coil 31, which is concentric with the disc 32. The remainder of the compartment 30 is filled with a mineral oil in which is suspended a finely divided magnetic material, forming a magnetic fluid suspension 33.

The clutch coil 17 is connected through conventional means (not shown) to slip rings 34 mounted on the shaft 14 and thence through brushes 35 and lead wires 36 to an outside source of power supply. The brake coil 31 is connected to the same outside source of power supply through the lead wires 37. These two circuits are made and broken by pushbuttons 38 and 39. The two pushbuttons act in conjunction with each other about the pivot point 40 by means of an interlocking bar 82 so that the closing of the clutch circuit automatically opens the brake circuit and vice-versa.

The species of the invention shown in Fig. 2 is designed to reduce the overall space occupied by the mechanism. In this embodiment, one driven clutch member is utilized to operate in conjunction with both the driving shaft and the brake coil.

With reference to Fig. 2, a frame housing 45 is supported by an integral base 46. Forming the interior of the frame is a chamber 74. The frame 45 is journalled to receive bearings 47, and these bearings support a driving shaft 48, connected to any suitable source of motive power. Integral with the driving shaft 48 is a driving clutch plate 49, and rigidly mounted close to the outer edge thereof is an annular driving clutch member 50.

A driven shaft 51 is supported by bearings 85 which are positioned in the frame housing 45. A driven clutch member 52 is mounted integrally with one end of the shaft 51, and this clutch member contains an annular opening 53 into part of which is fitted a clutch coil 54. The annular clutch member 50 projects into the remaining part of the annular opening 53 and is positioned in close proximity with the clutch coil 54 and the inner walls of the driven clutch member 52.

All of the open space within the chamber 74 of frame housing 45 is filled with a mineral oil in which is suspended finely divided magnetic material, forming a magnetic fluid suspension 55.

A brake coil 56 is located in an annular recess 57 of the frame housing 45. This brake coil is connected to an outside source of power supply through lead wires 58. The clutch coil 54 is connected through conventional means (not shown) to slip rings 59, which are mounted on the driven shaft 51. The circuit is completed through brushes 60 and lead wires 61 to the same outside source of power which supplies the brake coil 56.

The clutch coil and brake coil circuits are made and broken by pushbuttons 62 and 63. The two pushbuttons act in conjunction with each other about the pivot point 75 by means of an interlocking bar 83 so that the closing of the clutch circuit automatically opens the brake circuit and vice-versa.

All clutching and braking members described in connection with pages 1 and 2 are of magnetic material to aid in the establishing of the magnetic couplings.

The sequence of operation of the embodiment shown in Fig. 1 is as follows: The pushbutton 38 is depressed, completing the circuit from the outside source of power supply through the slip rings 34 to the clutch coil 17. This energizes the clutch coil and sets up a magnetic field through the driving clutch member 15, the plate 18 and the magnetic material suspended in the oil. The driven clutch disc 27, which is positioned inside the driving clutch assembly, becomes a part of the same magnetic field.

When the driving shaft 14 is turned by an outside source of motive power, this turning movement is transmitted to the disc 27 by means of the magnetic attraction set up in the clutch housing, and the disc in turn transmits this motion to the driven shaft 19, of which it is an integral part.

When it is desired to bring the driven shaft 19 to a stop, the pushbutton 39 is depressed. This action not only completes the circuit to the brake coil 31, but also breaks the circuit to the clutch coil 17, thus deenergizing both the coil and the magnetic field which held the disc 27 and the driven shaft 19 in operative connection with the driving shaft 14. The driven shaft 19 is now brought to a stop by the action on the braking disc 32 of the magnetic field which has been set up through that part of the frame housing 11 adjacent to the brake coil 31, and through the magnetic particles in the oil.

The sequence of operation of the embodiment shown in Fig. 2 is as follows: The pushbutton 63 is depressed, completing the circuit from the outside source of power supply through the slip rings 59 to the clutch coil 54. This energizes the clutch coil 54 and sets up a magnetic field through the driven clutch member 52, the magnetic material suspended in the oil and through the driving clutch plate 49 and the annular clutch member 50.

When the driving shaft 48 is turned by an outside source of motive power, this turning movement is transmitted through the clutch plate 49 and the annular clutch member 50 to the driven clutch member 52 by means of the magnetic attraction set up within the chamber 74. The clutch member 52 in turn transmits this motion to the driven shaft 51, on which it is rigidly mounted.

When it is desired to bring the driven shaft 51 to a stop, the pushbutton 62 is depressed. This action both completes the circuit to the brake coil 56 and breaks the circuit to the clutch coil 54. When the clutch coil circuit is broken, the magnetic field which held the driven clutch member 52 and the driven shaft 51 in operative connection with the driving shaft 48 is deenergized. The driven shaft 51 may now be brought to a stop by the action on the clutch member 52 of the magnetic field which has been set up through that part of the frame housing 45 adjacent to the brake coil 56 and through the magnetic material in the oil.

In Fig. 3 is shown an electrical system which enables the acceleration, deceleration and braking action of the clutch and brake combination to be accomplished gradually and in a predetermined length of time. This control system may be used with either the species of the invention shown in Fig. 1 or the species shown in Fig. 2, being an alternative to the make and break pushbutton arrangement shown in Figs. 1 and 2.

Circular rheostats 64 and 65, each having resistance mounted for only half of its circle, are mounted so that the resistance half of one corresponds with the open half of the other, and vice-versa. Arms 66 and 67 of the two rheostats are ganged together so that as one arm moves through the resistance half of its rheostat, the other arm is moving over the open half of its rheostat.

The two rheostat arms 66 and 67 are caused to move by a reversible motor 68, controlled by a pushbutton station 69, containing startbutton 72 and stopbutton 73. The limit switches 70 and 71 are connected into the power supply of the motor 68 and serve to stop the motor at the point where either rheostat arm has finished cutting out all of the resistance in its particular rheostat. Rheostat arm 67 is connected to the brake coil 31—56 and rheostat arm 66 is connected to the clutch coil 17—54. The two coils are energized through the two rheostat circuits in conjunction with leads 80 and 81, connected to a source of power supply. (Not shown.)

In operation the motor 68 is started by pushing the startbutton 72 of the pushbutton station 69. This causes the rheostat arm 67 connected with the brake coil 31—56 to move in a counterclockwise direction, cutting in resistance of the rheostat 65 as it moves and thus decreasing the current passing through the brake coil. This reduction of current reduces the magnetic field in the space 30 and thus reduces the braking effect. After the rheostat arm 67 has cut in all of the resistance in the rheostat, it continues to move in a counterclockwise direction, moving onto the open half of its rheostat. This disconnects the brake coil from its circuit and reduces the braking effect to zero.

At the same time that arm 67 starts to move onto the open half of its rheostat, the rheostat arm 66, which is connected to the clutch coil 17—54 and which is ganged with the arm 67, begins cutting out resistance of the rheostat 64 as it moves counterclockwise across the resistance half of its rheostat. This causes a gradual increase in the current passing through the clutch coil, and thereby a gradual increase in the torque transmitted by the magnetic coupling. The result is to give a smooth acceleration to the driven shaft from zero to maximum transmission of torque, which occurs when all of the resistance has been cut out.

When the arm 66 has reached the point where all of the resistance in the rheostat 64 has been cut out, the limit switch 70 operates to stop the motor by disconnecting it from its power supply.

When it is desired to brake the driven shaft, the stopbutton 73 of the pushbutton station 69 is pushed, which causes the motor 68 to run in the reverse direction and move the two rheostat arms in a clockwise direction. The arm 66 will cut in resistance and cause the driven shaft to decelerate gradually. When all of the resistance has been cut in, the ganged arm 67 will start cutting out resistance and gradually increase the braking effect. When the arm 67 has cut out all of the resistance in the rheostat 65, the braking torque is at a maximum, and the limit switch 71 will then operate at that point to stop the motor by disconnecting it from its power supply.

By the use of this control system, sudden applications of force to the system will be avoided and smooth acceleration, deceleration and braking will be assured.

It is to be understood that the above-described arrangements are simply illustrative of the principles of the invention. Numerous other arrangements may be readily devised by those skilled in the art which will embody the principles of the invention and fall within the spirit and scope thereof.

What is claimed is:

1. In a combination clutch and brake structure, a stationary housing including a closed chamber, magnetic driving and driven members in spaced relation in the chamber, a unitary body of fluid having magnetic particles suspended therein disposed between the members and between the driven member and the housing, and means for selectively magnetizing different portions of the fluid body to selectively establish a viscous connection between the driven member and the driving member, or between the driven member and the housing.

2. In a combination clutch and brake structure, a stationary housing including a closed chamber, magnetic driving and driven members in spaced relation in the chamber, a unitary body of fluid having magnetic particles suspended therein disposed between the members and between the driven member and the housing, and means for selectively magnetizing different portions of the fluid body to selectively establish a viscous connection between the driven member and the driving member, or between the driven member and the housing, said means being arranged to break one viscous connection substantially simultaneously with the establishing of the other.

3. In a combination clutch and brake structure, a stationary housing including a closed chamber, magnetic driving and driven members in spaced relation in the chamber, a unitary body of fluid having magnetic particles suspended therein disposed between the members and between the driven member and the housing, and means for selectively magnetizing different portions of the fluid body to selectively establish a viscous connection between the driven member and the driving member, or between the driven member and the housing, and means for varying the viscosity of the connections to provide for gradual acceleration and declaration of the driven member.

4. In a combination clutch and brake structure, a stationary housing including a closed member, magnetic driving and driven members in spaced relation in the chamber, a unitary body of fluid having magnetic particles suspended therein disposed between the members and between the driven member and the housing, means comprising two energizing circuits for selectively magnetizing different portions of the fluid body to selectively establish a viscous connection between the driven member and the driving member, or between the driven member and the housing, and means for varying the viscosity of the connections to provide for gradual acceleration and deceleration of the driven member, said means comprising two circular rheostats for varying the current in the two energizing circuits, each rheostat having resistance over half of its face, and mounted together so that their resistance halves are in opposition, two rheostat arms which are ganged together to move in unison, and means for moving the rheostat arms first in one direction and then in the opposite direction.

5. In a combination clutch and brake structure, a stationary housing including a closed chamber, magnetic driving and driven members in spaced relation in the chamber, a unitary body of fluid having magnetic particles suspended therein disposed between the members and between the driven member and the housing, means comprising two energizing circuits for selectively magnetizing different portions of the fluid body to selectively establish a viscous connection between the driven member and the driving member, or between the driven member and the housing, and means for varying the viscosity of the connections to provide for gradual acceleration and deceleration of the driven member, said means comprising two circular rheostats for varying the current in the two energizing circuits, each rheostat having resistance over half of its face, and mounted together so that their resistance halves are in opposition, two rheostat arms which are ganged together to move in unison, and means for moving the rheostat arms first in one direction and then in the opposite direction, said means for moving the rheostat arms being arranged to begin reducing the decelerating effect to zero on the initiation of the acceleration action, and to begin reducing the accelerating effect to zero on the initiation of the deceleration action.

VINCENT J. SALEMME.

REFERENCES CITED

The following references are of record in the file of this patent:

UNITED STATES PATENTS

| Number | Name | Date |
| --- | --- | --- |
| 2,233,060 | Parmin | Feb. 25, 1941 |
| 2,333,863 | Hull | Nov. 9, 1943 |
| 2,411,122 | Winther | Nov. 12, 1946 |